US008050394B2

(12) United States Patent
Fotta et al.

(10) Patent No.: US 8,050,394 B2
(45) Date of Patent: Nov. 1, 2011

(54) SYSTEM AND METHOD FOR CONTROL OF COMMUNICATIONS CONNECTIONS AND NOTIFICATIONS

(75) Inventors: Keith A. Fotta, Duxbury, MA (US); Richard P. Boudrieau, Duxbury, MA (US)

(73) Assignee: Gryphon Networks Corp., Norwood, MA (US)

( * ) Notice: Subject to any disclaimer, the term of this patent is extended or adjusted under 35 U.S.C. 154(b) by 1433 days.

(21) Appl. No.: 11/242,614

(22) Filed: Oct. 3, 2005

(65) Prior Publication Data

US 2006/0159060 A1    Jul. 20, 2006

Related U.S. Application Data

(63) Continuation-in-part of application No. 11/111,494, filed on Apr. 21, 2005, which is a continuation-in-part of application No. 11/021,564, filed on Dec. 23, 2004, which is a continuation-in-part of application No. 10/820,452, filed on Apr. 8, 2004.

(51) Int. Cl.
*H04M 3/22* (2006.01)
*H04M 3/42* (2006.01)
*H04M 17/00* (2006.01)

(52) U.S. Cl. ............... 379/188; 379/114.15; 379/196; 379/197; 379/210.02; 379/210.03

(58) Field of Classification Search ............. 370/230, 370/351, 352, 389, 400, 431, 188, 196–200, 370/210.02, 210.03; 379/188, 196–200, 379/210.02, 210.03, 114.14–114.2
See application file for complete search history.

(56) References Cited

U.S. PATENT DOCUMENTS

| 5,499,289 | A | 3/1996 | Bruno et al. |
| 5,960,073 | A | 9/1999 | Kikinis et al. |
| 5,999,932 | A | 12/1999 | Paul |
| 6,049,782 | A | 4/2000 | Gottesman et al. |
| 6,052,709 | A | 4/2000 | Paul |
| 6,081,591 | A | 6/2000 | Skoog |
| 6,081,592 | A | 6/2000 | Battle |

(Continued)

FOREIGN PATENT DOCUMENTS

EP   0 946 022 A2   9/1999

(Continued)

OTHER PUBLICATIONS

"Do Not Call", presented by Mutual of Omaha, pp. 1-4 (2004).

(Continued)

*Primary Examiner* — Harry S Hong
(74) *Attorney, Agent, or Firm* — Hamilton, Brook, Smith & Reynolds, P.C.

(57) ABSTRACT

A method of implementing call compliance at a central facility through account specific access, the method involving: receiving a call from a caller on an incoming connection; obtaining and verifying account information; enabling the caller on the incoming connection to initiate an outgoing call on an outgoing connection depending on account information; receiving over the incoming connection an identifier of a destination to which a call is to be initiated over the outgoing connection; checking a do-not-call database for an indication of whether the destination is a do-not-call destination; if it is determined that the destination is a do-not-call destination, blocking the outgoing call from taking place over the outgoing connection; and if it is determined that the destination is not a do-not-call destination, allowing the outgoing call to take place over the outgoing connection.

36 Claims, 9 Drawing Sheets

U.S. PATENT DOCUMENTS

| | | | |
|---|---|---|---|
| 6,092,099 | A | 7/2000 | Irie et al. |
| 6,130,937 | A | 10/2000 | Fotta |
| 6,249,575 | B1 | 6/2001 | Heilmann et al. |
| 6,321,267 | B1 | 11/2001 | Donaldson |
| 6,330,317 | B1 | 12/2001 | Garfinkel |
| 6,493,007 | B1 | 10/2002 | Pang |
| 6,643,686 | B1 | 11/2003 | Hall |
| 6,788,773 | B1 | 9/2004 | Fotta |
| 6,853,717 | B1 | 2/2005 | Frentz et al. |
| 7,020,259 | B2 | 3/2006 | Hussain et al. |
| 7,023,980 | B2 | 4/2006 | Lenard |
| 7,158,630 | B2 | 1/2007 | Fotta et al. |
| 7,162,474 | B1 | 1/2007 | Harker et al. |
| 7,194,075 | B2 | 3/2007 | Fotta |
| 7,212,620 | B1 | 5/2007 | Mastro |
| 7,215,760 | B2 | 5/2007 | Lenard |
| 7,333,798 | B2 | 2/2008 | Hodge |
| 7,412,049 | B1 | 8/2008 | Koch |
| 7,461,263 | B2 | 12/2008 | Prince |
| 7,474,741 | B2 | 1/2009 | Brunson |
| 7,536,437 | B2 | 5/2009 | Zmolek |
| 7,574,471 | B2 | 9/2009 | Fotta et al. |
| 2002/0075303 | A1 | 6/2002 | Thompson et al. |
| 2002/0152272 | A1 | 10/2002 | Yairi |
| 2002/0169954 | A1 | 11/2002 | Bandini et al. |
| 2003/0041126 | A1 | 2/2003 | Buford et al. |
| 2003/0074286 | A1 | 4/2003 | Rodrigo |
| 2003/0074397 | A1 | 4/2003 | Morin et al. |
| 2003/0093320 | A1 | 5/2003 | Sullivan |
| 2003/0126218 | A1 | 7/2003 | Sakonsaku |
| 2003/0132972 | A1 | 7/2003 | Pang |
| 2003/0135737 | A1 | 7/2003 | Bouthors |
| 2003/0212566 | A1 | 11/2003 | Fergusson et al. |
| 2003/0217079 | A1 | 11/2003 | Bakalash et al. |
| 2004/0066926 | A1 | 4/2004 | Brockbank et al. |
| 2004/0109557 | A1 | 6/2004 | Lenard |
| 2004/0114747 | A1 | 6/2004 | Trandal et al. |
| 2004/0148506 | A1 | 7/2004 | Prince |
| 2005/0031107 | A1 | 2/2005 | Fotta |
| 2005/0074114 | A1 | 4/2005 | Fotta et al. |
| 2005/0144279 | A1 | 6/2005 | Wexelblat |
| 2005/0177599 | A1 | 8/2005 | Goodman |
| 2005/0226151 | A1 | 10/2005 | Fotta et al. |
| 2005/0226221 | A1 | 10/2005 | Fotta et al. |
| 2005/0249209 | A1 | 11/2005 | Fotta et al. |
| 2006/0159060 | A1 | 7/2006 | Fotta et al. |
| 2007/0136789 | A1 | 6/2007 | Fotta et al. |

FOREIGN PATENT DOCUMENTS

| | | |
|---|---|---|
| WO | WO 98/51062 A1 | 11/1998 |
| WO | WO 03/054764 A1 | 7/2003 |
| WO | WO 03/107644 A1 | 12/2003 |
| WO | WO 2006/115909 A1 | 11/2006 |
| WO | WO 2007/041436 | 4/2007 |

OTHER PUBLICATIONS

"Do-Not-Call Compliance", presented by VeriSign, pp. 1-7 (2004).
"InboxMaster™" brochure, from Secluda Technologies, Inc.™ (11 pp) (2003).
Myers, J., *Network Working Group, Request for Comments:* 2222: 1-16 (Oct. 1997), http://www.ietf.org/rfc/rfc2222.txt Nov. 11, 2003.
Myers, J., *Network Working Group, Request for Comments:* 2554: 1-11 (Mar. 1999).
Franks, J., et al., Network Working Group, Request for Comments: 2617: 1-34 (Jun. 1999), http: //www.ietf.org/rfc/rfc.2617.txt?number=261 7 Nov. 11, 2003.
Office Action, Mail Date Mar. 21, 2008, U.S. Appl. No. 11/111,494.
Office Action, Mail Date Apr. 21, 2008, U.S. Appl. No. 10/820,452.
Office Action, Mail Date Jan. 9, 2009, U.S. Appl. No. 11/111,494.
Office Action, Mail Date Jan. 27, 2009, U.S. Appl. No. 10/820,452.
Office Action, Mail Date Feb. 4, 2009, U.S. Appl. No. 11/021,564.
Office Action, Mail Date Jul. 20, 2009, U.S. Appl. No. 11/111,494.
International Search Report from International Application No. PCT/US2006/014584, Mail Date: Jul. 27, 2006.
International Search Report from International Application No. PCT/US2006/038322, Mail Date: Jan. 22, 2007.
Office Action, Mail Date Jun. 23, 2009, U.S. Appl. No. 11/302,958.
International Preliminary Report on Patentability, International Appl. No. PCT/US2006/014584, issued Oct. 23, 2007.
International Preliminary Report on Patentability, International Appl. No. PCT/US2006/038322, mailed Apr. 17, 2008.
Communication pursuant to Article 94(3) EPC, dated Dec. 3, 2009, EP 06 750 590.9.
International Search Report from International Application No. PCT/US05/31435 dated Feb. 24, 2006.
Office Action dated Nov. 13, 2009, U.S. Appl. No. 10/820,452.
Office Action dated Oct. 27, 2009, U.S. Appl. No. 11/021,564.
Office Action dated Jan. 6, 2010, U.S. Appl. No. 11/302,958.
Office Action dated Apr. 12, 2010, issued in U.S. Appl. No. 10/820,452.
Office Action (FINAL) dated Mar. 11, 2010, issued in U.S. Appl. No. 11/111,494.
Office Action dated Apr. 26, 2010, U.S. Appl. No. 11/021,564.
Office Action dated Aug. 3, 2010, issued in U.S. Appl. No. 11/111,494.
Final Office Action dated Jul. 21, 2010, issued in U.S. Appl. No. 11/302,958.
Office Action dated Oct. 7, 2010, U.S. Appl. No. 10/820,452.
Office Action dated Oct. 15, 2010, U.S. Appl. No. 11/021,564.
U.S. Office Action dated Jan. 19, 2011, issued in U.S. Appl. No. 11/111,494.
U.S. Office Action dated Mar. 17, 2011, issued in U.S. Appl. No. 10/820,452.
Notice of Allowance dated Apr. 18, 2011, issued in U.S. Appl. No. 11/021,564.

SYSTEM AND METHOD FOR CONTROL OF COMMUNICATIONS CONNECTIONS AND NOTIFICATIONS

RELATED APPLICATIONS

This application is a continuation-in-part of application Ser. No. 11/111,494 filed Apr. 21, 2005, which is a continuation-in-part of application Ser. No. 11/021,564 filed Dec. 23, 2004, which is a continuation-in-part of application Ser. No. 10/820,452 filed Apr. 8, 2004. The entire teachings of the above applications are incorporated herein by reference.

BACKGROUND OF THE INVENTION

Recently, federal and state solicitation laws and regulations have mandated that a consumer, who expresses a desire not to be solicited by telephone or other electronic media such as electronic mail, not be called or e-mailed. By regulation, such as the United States Federal Trade Commission's (FTC) Telemarketing Sales Rules (TSR), a business must maintain a list of telephone numbers for such consumers, known as a "Do-Not-Call" (DNC) list, and take appropriate measures to ensure that outgoing calls to telephone numbers on a DNC list are somehow blocked. The federal government is also considering the establishment of a federal "Do-Not-E-Mail" list to enable a consumer to prevent electronic mail solicitations.

The DNC lists can include one or more lists specific to a particular business, as well as state-wide, national and industry-imposed lists such as the Direct Marketing Association (DMA) Telephone Preference Service (TPS) list. A single violation of a federal and/or State DNC regulation may result in a substantial fine. Thus, DNC compliance management is a particularly critical and challenging issue for businesses that rely on telephone solicitations as a core marketing tool.

SUMMARY OF THE INVENTION

Systems exist for handling DNC compliance management as well as for accommodating cases in which a blocked or prohibited number may be reached based on certain exemptions to the regulations.

Where small or geographically diverse companies have a number of agents making calls from varying locations, the present invention provides a compliance solution for small or geographically diverse companies that value the simplicity of a pre-paid service. Using a calling card (which may also be referred to as an access card), a company and/or independent agents may gain access to a compliance solution without the need to engage in a formal contracting process that is costly for both the customer and the service provider that are small or geographically dispersed.

Accordingly, one aspect of the invention is a method and system of providing call compliance. An agent or caller accesses the system by initiating a phone call over an incoming connection. The system receives an identification number (including but not limited to ANI or PIN) from the caller on the incoming connection. The identification number is then verified against an account database to evaluate corresponding account information. Upon verification, the caller on the incoming connection is able to initiate an outgoing call on an outgoing connection based on account information. After receiving the destination number to which a call is to be initiated over the outgoing connection, the system provides call compliance treatment to the outgoing call to the destination; and updates account information based on the outgoing call. In addition to call compliance, other embodiments of the present invention may provide controlled communications with existing business relationship as well as access to customer relations management systems.

The present invention provides certain improvements and advantages over the prior art. In one aspect, the present invention provides a method and system of selectively prohibiting a communications connection between an origin and destination in a communications network based on one or more mediation rules and one or more lists of prohibited and exempted destination identifiers. The origin and destination may be communications devices directly or indirectly connected to the communications network such as telephones, cellular telephones, personal digital assistances, pagers, computers, computer client interfaces, or remote computer terminals.

In an embodiment, a connection unit may be used that receives or initiates a request for a communications connection between an origin and destination by sending a request to the control unit and receiving an order from the control unit to prohibit or allow the communications connection based on the destination identifier. The connection unit may be an Interactive Voice Response (IVR) application, a predictive dialer server, a distributed predictive dialer system, a switch, router, or an electronic mail server.

The connection unit typically provides a bridging capability to establish a communications connection between an origin and destination. The destination identifier may be a communications device address such as a domestic or international telephone number, Internet Protocol address, or an electronic mail address. "Prohibited" destination identifiers may be identifiers that have been designated by a governmental authority, private organization, client, customer, or other party as blocked or prohibited from being connected to or contacted by a particular client or all clients. "Exempted" destination identifiers may be identifiers that have been designated by a governmental authority, private organization, client, customer, or other party as being exempted from being a prohibited destination identifier.

The prohibited and exempted destination identifier lists may be contained within one or more tables of one or more databases. Also, the lists of prohibited destination identifiers may be derived from any one or a combination of a Federal Do-Not-Call list, a State Do-Not-Call list, a DMA Do-Not-Call list, a client internal list, a Very Important Person list, and other defined lists. Furthermore, the lists of exempted destination identifiers may be derived from any one or a combination of an Existing Business Relationship (EBR) exemption list, Do-Not-Call exemption list, State Do-Not-Call exemption list, a VIP exemption list, and other exemption lists. The exemption lists may also contain any one or combination of exemption key, type, and date of contact associated with each exempted destination identifier.

Mediation rules may be used to determine a sequence of comparisons made between a destination identifier and one or more lists of exempted and prohibited identifiers wherein each comparison with a list of exempted identifiers determines whether the comparison with an associated list or lists of prohibited destination identifiers is bypassed or ignored. An associated list of prohibited destination identifiers is "bypassed" when the comparison with the prohibited destination list is not performed. An associated list of prohibited destination identifiers is "ignored" when the comparison with the prohibited destination list is performed, but no action to control the communications connection based on the result is taken. The result is only logged in an audit record for some other purpose such as record keeping or performing a statistical analysis of the control system. If the prohibited destination list is not bypassed or ignored, a comparison is performed, resulting in an action to possibly prohibit or allow the communications connection. The prohibited and exempted destination lists may be modified from an origin or a secondary interface such as a World-Wide-Web (WWW) connection from a remote computer or an automated remote process from a client site.

The control unit may be a computer server that resides on the premises of a client, a local exchange carrier, local administration facility, central administration facility, or other remote facility. The control unit may interface with local prohibited and exempted destination lists. These local prohibited and exempted destination lists may be periodically synchronized with other prohibited and exempted destination lists that are remotely located at another facility such as a local administration facility, local exchange carrier, central administration facility, or another facility.

The control unit may also be a software application within a remote client computer that accesses an internal or remote prohibited and exempted lists within a central administration facility.

The prohibited and exempted destination lists may be dynamically added or removed and the mediation rules updated to flexibly adapt the system to continuously support new connection prohibition rules. Also, multiple destination identifiers may be examined in relation to a particular origin to determine whether to prohibit or allow communications connections between the origin and each of the multiple destinations. For security reasons, each client user may be identified and authenticated.

The control unit, based on the mediation rules, may also use additional client and customer information to determine whether to prohibit or allow a communications connection such as a client user identifier, client identifier, customer identifier, client office identifier, product identifier, geographic area, date, time, exemption type duration, origin identifier, internal client criteria, or internal customer criteria. The control unit may also generate logs of communications connections having prohibited, allowed, and improper destination identifiers.

The present invention also includes an analysis system and method for selectively designating whether a communications connection between an origin and one or more destinations are prohibited. The analysis system typically includes an interface unit that receives one or more proposed destination identifiers, at least one list of prohibited destination identifiers, at least one list of exempted destination identifiers, and an analysis unit that designates whether the communication connection between an origin and one or more proposed destinations are prohibited or allowed based on one or more mediation rules and the list of prohibited and exempted destination identifiers.

While the control unit provides real-time control of a communications connection, the analysis unit performs a precheck of one or more proposed destination identifiers and generates a list that designates which destination identifiers are prohibited or allowed. A client user or agent may then review the list and decide which destinations to contact. The analysis unit is likely preferred by small business clients with a smaller customer base and less resources to contact customers. The analysis unit may reside at the central administration facility and be remotely accessed by a client. Alternatively, the analysis unit may be a computer application within a client's computer system that accesses a remote or internal list of prohibited and exempted destination identifiers.

Another embodiment includes a control system for selectively establishing a communications connection between an origin and destination within a communications network where the communications connection is established by a connection unit that bridges a first connection with the origin with a second connection with the destination. The system preferably includes at least one list of prohibited destination identifiers, at least one list of exempted destination identifiers, and a control unit that orders the connection unit to establish the communications connection between the origin and destination based on one or more mediation rules and the lists of prohibited and exempted destination identifiers.

The control unit may also deliver one or more notification messages to either or both the origin or destination. The notification messages may be delivered to the origin from the connection unit using the first connection either before the communications are established with the destination, during established communications with the destination, or after communications have ended with the destination. The notification messages may also be delivered to the destination from the connection unit using the second connection either before the communications are established with the origin, during established communications with the origin, or after communications have ended with the origin.

The notification message may be any one or combination of an audio recording, interactive voice response, human-initiated voice message, text message, electronic mail message, instant message, multimedia message, IP-based message, audio tone, sequence of audio tones, visual indicator, or a graphical image. The notification message may indicate to the origin user which exemption is being applied by the system as determined by the mediation rules and at least one list of exempted destination identifiers. The notification message may even request information from either or both the origin or destination.

The notification message, however, may include information not based on the mediation rules such as information derived from any one of or combination of client-specific requirements, origin agent-specific requirements, and destination user-specific requirements. The notification message may be delivered in-band through the connection unit or out-of-band through some other media to the origin or destination.

In yet another embodiment, the analysis unit may provide one or more notification messages associated with the one or more proposed communication connections. When the interface unit delivers a certified list of proposed destination identifiers to the analysis unit, the analysis unit may designate prohibited and allowed destination identifiers and also send a designation list to the interface unit that includes one or more notification messages. These notification messages are typically associated with particular destination identifiers and preferably provide relevant information associated with the destination identifier. The analysis unit may also generate logs of allowed destination identifiers and associated notification.

A further embodiment may be a notification system for delivering messages to an origin and destination of a communications connection in a communications network. The notification system may include a connection unit that establishes a first connection with the origin and a second connection with the destination and bridges the first and second connections to establish a communications connection between the origin and destination. The notification system also includes a notification unit that delivers at least one notification message to either or both the origin and destination.

The notification messages may originate from the notification unit, a relationship management system, a control unit, or some other information system.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
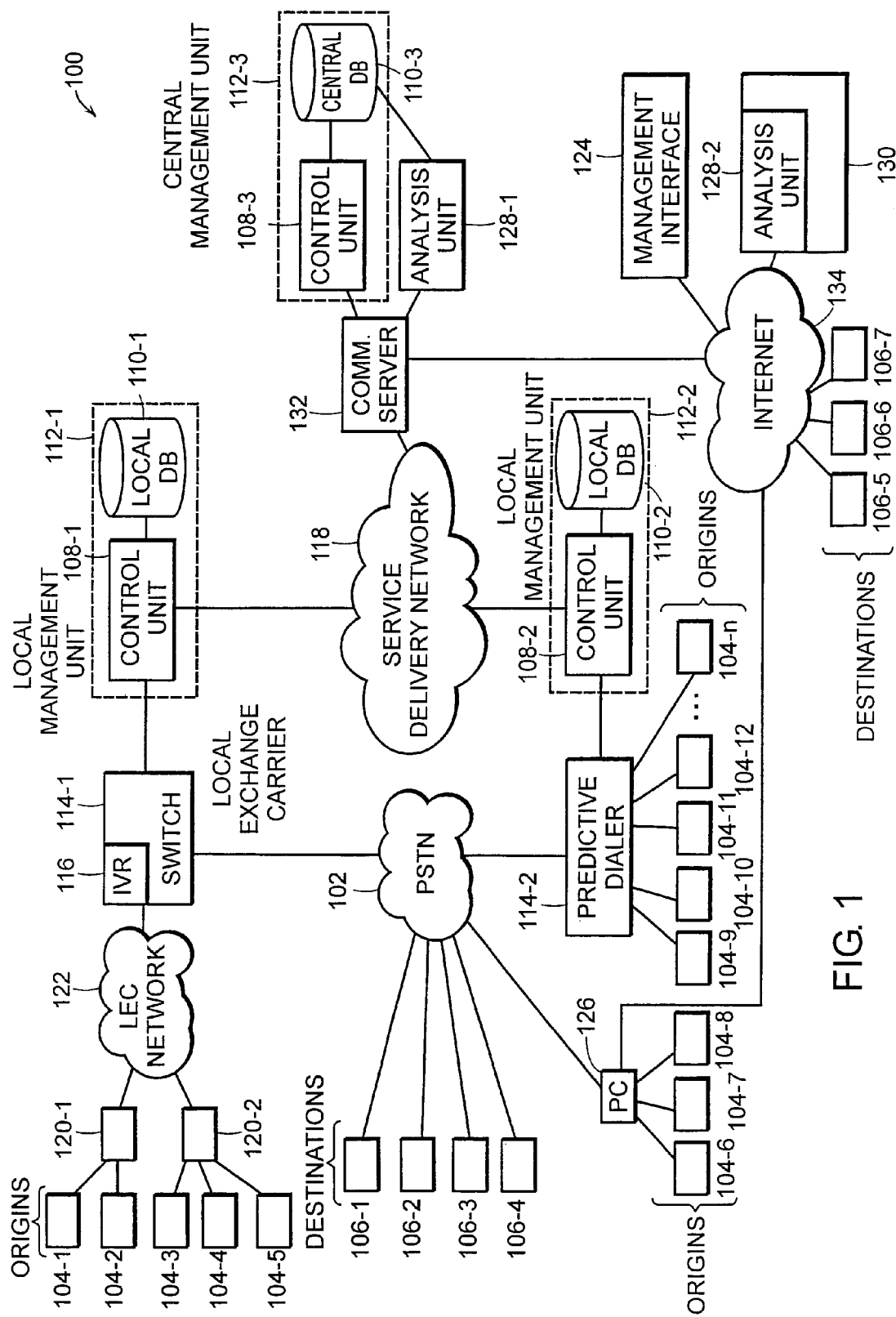
FIG. 1 is a schematic diagram showing a communications control system according to the principles of the present invention.

One embodiment of the present invention is a control system for selectively prohibiting a communications connection between an origin and a destination in a communications network. FIG. 1 shows an example of a control system 100 interconnected with telecommunications network 102, i.e., the Public Switched Telecommunications Network (PSTN), that illustrates principles of the present invention. It is understood, however, that the present invention applies to any communications system and, more particularly, to allowing or prohibiting a communications connection between an origin and destination therein.

To selectively prohibit or allow a communications connection between an origin 104 and destination 106, preferably in real-time or near real-time, a control unit 108 interfaces with a database 110, collectively referred to herein as a management unit 112. The origin 104 and destination 106 are typically telephones, but may be other types of communications devices such as cellular telephones, personal digital assistances, pagers, computers, computer client interfaces, or remote computer terminals. Origin 104 and destination 106 may each be connected directly or indirectly to PSTN 102. For example, origin 104-1 may be connected through office private branch exchange (PBX) 120-1 to local exchange carrier network 122 which connects to local exchange carrier connection unit 114-1, a telecommunications switch.

Figure 2:
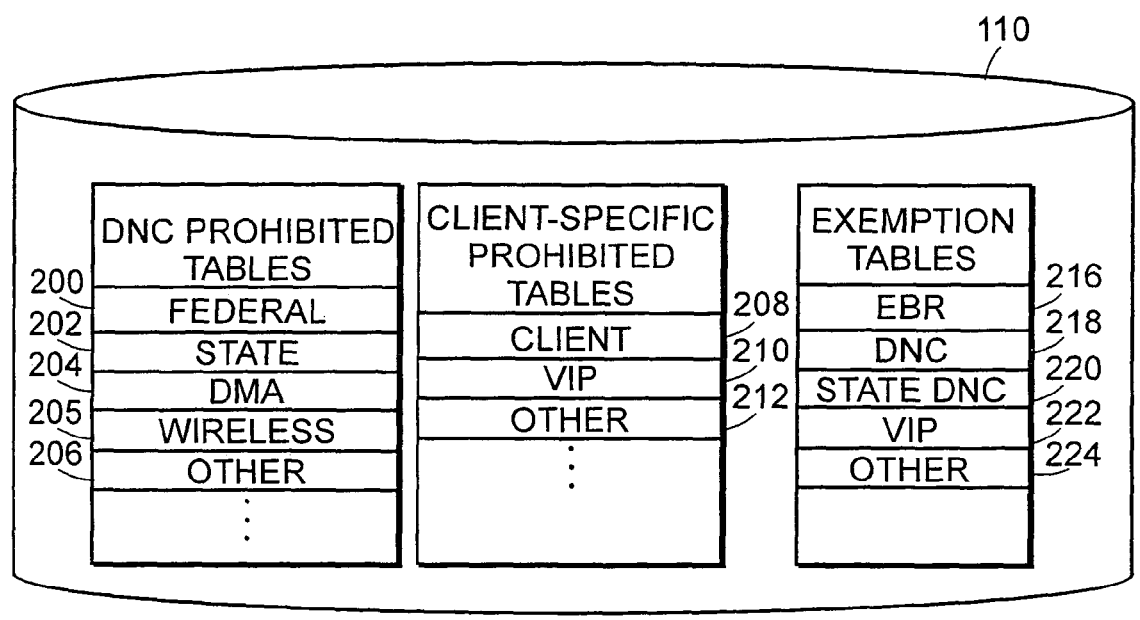
FIG. 2 is a high level diagram of the databases of the communications control system.

The database 110 may have one or more tables of prohibited and exempted destination identifiers as shown in FIG. 2. The tables are shown in three groups for descriptive purposes, but may be arranged in any order or configuration. The DNC prohibited tables are tables that typically are the same for any client and include Federal DNC list 200, State DNC list 202, DMA DNC list 204, Wireless DNC list 205, and other DNC lists 206. The client-specific prohibited DNC tables are typically unique to each client and include Client DNC list 208, VIP DNC list 210, and other DNC list 212. The exemption tables may include EBR exemption list 216, DNC exemption list 218, State DNC exemption list 220, VIP exemption list 222, and other exemption lists 224. The destination identifier is usually a network address associated directly or indirectly with a destination communications device or a destination user. For example, the device address may be a telephone number for a device connected to the PSTN 102, an Internet Protocol (IP) address for a device connected to the Internet, or an electronic mail address for an Internet electronic mail account in an electronic mail server.

Using one or more mediation rules and the lists of prohibited and exempted destination identifiers in database 110, control unit 108 determines whether a communications connection between a particular origin 104 and destination 106 is prohibited or allowed. To facilitate a more rapid response to a communications connection request, management unit 112 may be mirrored at a client's local facility or local carrier exchange. For example, local management unit 112-1, comprising local control unit 108-1 and local database 110-1, may control communications connections established by connection unit 114-1, a telecommunication switch with Interactive Voice Response (IVR) 116. Another local management unit 112-2, comprising local control unit 108-2 and local database 110-2, may control communications connections established by connection unit 114-2, which in this example is a predictive dialer for multiple origins 104 such as 104-9.

A central management unit 112-3, comprising control unit 108-3 and database 110-3, may control communications connections. Central management unit 112-3 may interface with any connection unit 114 via service delivery network 118 or any other remote computer or interface such as computer 126, management interface 124, and computer 130 via network 134 which, in this instance, may be the Internet.

The control unit 108 may be a computer server or gateway that resides on the premises of a client, a local exchange carrier, local administration facility, central administration facility, or other remote facility. Each control unit 108 and database 110 may be periodically synchronized with other control units 108 and databases 110 based on a synchronization mechanism described in International Patent Application PCT/US03/19145, the entire contents of which are incorporated herein by reference. Local databases 110-1 and 110-2 are typically not as large as 110-3 because the local databases may only need lists of prohibited and exempted destination identifiers specific to a local client while database 110-3 typically holds the lists for all clients. While the control unit 108-1 interfaces with local prohibited and exempted destination lists in database 110-1, control unit 108-1 may also interface with other prohibited and exempted destination lists in other databases 110 being remotely located at another facility such as another local administration facility wherein database 110-2 may be located. Control unit 108-1 or other control units 108 may interface remotely with databases 110 located in other locations such as a local exchange carrier, central administration facility, or remote facility.

Central management unit 112-3 and local management units 112-1 and 112-2 typically communicate with each other via Service Delivery Network 118 which may be a private network, a virtual private network within the Internet, a wide area network, local area network, or the like. Service Delivery Network 118 preferably is protected from eavesdropping with adequate security mechanisms such as encryption and authentication.

While FIG. 1 illustrates local management units 112-1 and 112-2 controlling the communications connection between an origin 104 and destination 106 by interfacing with connection units 114-1 and 114-2 respectively, either control unit 108 or both the control unit 108 and database 110 may be incorporated into the functionality of any connection unit 114 such as connection units 114-1 and 114-2, effecting direct control of the communications connection by the control unit 108. From another perspective, control unit 108 itself may establish the communications connection between an origin 104 and destination 106. It may, however, be more advantageous to utilize a separate management unit 112 that interfaces with multiple connection units 114 to reduce the overall cost of implementing communications connection control throughout a communications network.

In addition to being a telecommunications switch having an IVR application or a predictive dialer, connection unit 114 may be a distributed predictive dialer system, a router, a switch, electronic mail server, or a computer server such as a personal computer. The connection unit 114 generally acts as a bridging circuit to establish a communications connection between an origin 104 and destination 106. Further details regarding the operation of the IVR application and its interfacing capabilities with management unit 112 are provided in U.S. Pat. No. 6,130,937, the entire contents of which are incorporated by reference. International Patent Application PCT/US03/19145 also provides additional details regarding the use of an application specific interface (API) and an exemplary network configuration to facilitate communications between connection unit 114 and management unit 112.

The connection unit 114 may receive or initiate a request for a communications connection between an origin 104 and destination 106 that includes the destination identifier. For example, connection unit 114-1, typically uses IVR 116 to receive a call from an origin 104-1. The client user may use origin 104-1, e.g., a telephone, to dial a "1-800" number to obtain access to IVR 116. In an embodiment of the present invention, a unique authentication number can be used to provide access to the communications control system and can represent unique service accounts. For example, the accounts may be personal accounts for individual business customers seeking to comply with the Federal Do-Not-Call database, or the accounts may represent corporate accounts having access to a company's Do-Not-Call database as well as existing business relationship database. The authentication number can be, for example, a unique account number plus a Personal Identification Number (PIN). Alternatively, the client could be automatically authenticated by ANI recognition of the originating number, the originating number having been pre-registered to correspond to an account. Further, the account numbers can be provided on calling cards having machine readable information located on the card. The machine readable information can provide identification for corresponding account activation by a machine.

The control unit 108-1 will then validate the client user, using database 110-1 as belonging to a particular office associated with the client which can provide the appropriate communications control treatment based on the account. If valid, IVR 116 may prompt the client user of origin 104-1 for a 10-digit destination telephone number to subsequently place a call to a target customer 106-1. Once the destination telephone number is received, typically using dual-tone-multi-frequency (DTMF) detection, IVR 116 sends the call destination telephone number to local management unit 112-1. Depending on the mediation rules or account information which may specific to a particular client, control unit 108-1 compares the destination telephone number to one or more prohibited and/or exempted destination telephone number lists in local database 110-1 and then orders connection unit 114-1 to prohibit or allow the communications connection. The system may also provide clients with the ability to bypass the communications control system, if the account will be used to place a personal or non-business outgoing call.

Once connected, IVR 116 will prompt the client user to enter a pin identification number between 6-10 digits. The control unit 108-1 will then validate the client user, using database 110-1 as belong to a peculiar office associated with the client. If valid, IVR 116 may prompt the client user of origin 104-1 for a 10-digit destination telephone number to subsequently place a call to a target customer. Once the destination telephone number is received, typically using dual-tone-multi-frequency (DTMF) detection, IVR 116 sends the call destination telephone number to local management unit 112-1. Depending on the mediation rules which are preferably specific to a particular client, control unit 108-1 compares the destination telephone number to one or more prohibited and/or exempted destination telephone number lists in local database 110-1 and then orders connection unit 114-1 to prohibit or allow the communications connection.

In this voice communications scenario, the lists of prohibited destination identifiers may be derived from any one or a combination of a Federal DNC list 200, a State DNC list 202, a DMA list 204, a Wireless DNC list 205, a client internal list 208, or a Very Important Person (VIP) DNC list 210 as shown in FIG. 2. Other lists 206 defined by International, Federal, State, other governmental entities, trade organizations, associations, or private entities may also be included. Other client-specific lists 212 may further be included. In an electronic mail scenario, the list of prohibited destination identifiers may include a client do-not-email list, Domain Name List or IP address list.

The Federal DNC list 200 is typically a copy of the national Do-Not-Call list maintained by the FTC and enforced by the FTC, Federal Communications Commission (FCC), and States officials. Preferably, the list 200 is stored locally in database 110-1 to reduce possible query latencies, but may be accessed remotely by control unit 108-1 from central database 110-3 or even from a database maintained by the FTC, FCC, or other entity via the Internet or the like.

The state DNC list 202 may include multiple lists with each list associated with a particular state. Depending on the mediation rules, as defined by the client, control unit 108 may check one state, multiple states, or no state list for prohibited destination numbers. The DMA TPS list 204 is typically derived from a DMA-maintained do-not-call list which is required by certain states to be checked by telemarketers before calling a target customer. The DMA TPS list currently has more than 8 million destination telephone numbers. A Wireless DNC list 205 may be implemented that contains, for example, a list of cellular telephone or other wireless device addresses such as a telephone numbers, e-mail addresses, IP addresses, or domain name addresses associated with one or more groups of wireless devices.

The client internal DNC list 208 may be a client-specific list that includes destination telephone numbers of customers that have explicitly notified the client that they do not want to be solicited. Client internal DNC list 208 generally trumps all other lists or exemptions. The VIP list 210 may be a client-specific list typically of high value customers that the client does not want general client users or brokers to contact. The other client-specific DNC lists 212 may include a list of states or area codes associated with a particular agent that are prohibited or blocked from contact by the agent. The other client-specific DNC lists 212 may also include lists of area codes associated with particular client offices which are prohibited from contact by the office. The client agent or office restrictions allow a client to possibly prevent agents from different offices in different geographic locations from calling the same customers in a particular state or area code.

The lists of exempted destination identifiers may be derived from any one or a combination of an Existing Business Relationship (EBR) exemption list 216, DNC exemption lists 218, State DNC exemption lists 220, a VIP exemption list 222, or other exemption lists 224.

The EBR exemption list 216 is typically a client-specific list of destination identifiers of customers that may be contacted even though their destination number is contained within DNC list 200, State DNC list 202, or DMA DNC list 204. Under certain condition, depending on the existing business relationship between the client and a customer, certain federal and state regulations allows a particular client to contact a customer even though the customer's destination number is included within list 200, 202, or 204. The EBR list may include, but not be limited to, the following categories:

1. Purchased—Indicates that a customer has purchased a product from the client. Calls to these customers are permitted within the duration specified in the regulations.
2. Leased—Indicates that a customer has leased a product from the client. Calls to these customers are permitted within the duration specified in the regulations.
3. Rented—Indicates that a customer has rented a product from the client. Calls to these customers are permitted within the duration specified in the regulations.
4. Financial Transaction—Indicates that a customer has engaged in a financial transaction with the client. Calls to these customers are permitted within the duration specified in the regulations.
5. Inquiry—Indicates that a customer has made an inquiry with the client. Calls to these customers are permitted within the duration specified in the regulations.

Each of these exemptions may be defined by federal regulations and some states that have EBR regulations. Clients are typically required to choose which of these exemptions the control system 100 will support/elect. Clients typically provide a list of exempted destination identifiers along with the exemption type to a control system 100 administrator who enters the destination identifiers into the EBR exemption list 216 via interface such as management interface 124 or can be loaded by automated process from a remote client site or sites. Information included within EBR exemption list 216 may include any one or a combination of an exemption key, exemption type, and date of contact associated with each exempted destination identifier.

The EBR exemption key may be an integer associated with a category of EBR exemption. For example, the "Purchased" EBR exemption may have a key=1 as shown above while the "Inquiry" EBR exemption may have an EBR exemption key=5. The date of contact may be stored with the destination identifier in EBR exemption list 216 to enable control unit 108 to determine the duration of time in which a particular EBR exemption may be applied. For example, if a customer made an inquiry to the client on a certain date, federal or state regulations may allow the client to apply the exemption and override the Federal DNC list 200, State DNC list 202, or DMA DNC list 204 for a period of 30 days from the date of contact. The duration of each EBR exemption may be different or vary, requiring the use of an EBR exemption key, associated with each exempted destination number, to determine which EBR exemption applies and for what duration of time that EBR exemption is valid. Thus, the EBR exemption key and date of contact may be used by control unit 108 to identify a particular EBR exemption category and determine whether to apply the EBR exemption, depending on the duration that the exemption is valid from the date of contact.

The DNC exemption lists 218 may be client-specific or agent-specific lists of destination identifiers including, but not limited to, the following categories:

Prior Express Permission—When a customer of a client specifically gives permission to be contacted, the customer's destination identifier, e.g., telephone number, is recorded into database 110, allowing the customer to be contacted by the client. This category may be enabled or disabled by the client using a management interface 124.

Survey—When a customer responds to a client survey, the customer's destination identifier, e.g., telephone number, may be recorded into database 110, allowing the customer to be contacted by the client. This category may be enabled or disabled by the client using a management interface 124.

Personal Relationships—This category allows a client agent to designate certain destination identifiers as their "Friends and Family." Thus, allowing control unit 108 to bypass all DNC restrictions and allow communications connections to the designated destination identifiers. The destination identifier may be added to a personal relationship DNC exemption list 218 via the IVR 116 interface by the client agent or using a WWW interface from management interface 124 or some other remote computer connection to management unit 112. This category may be enabled or disabled by the client using management interface 124.

The State DNC exemption list 220 may be a client-specific list of flags associated with enabling or disabling State call curfews, Intrastate calls, Federal DNC list 200, State DNC lists 202, and DMA DNC list 204. The State DNC exemption list 220 may include, but not be limited, to the following:

Federal flag—this flag setting allows the client to set control unit 108 to ignore checking federal DNC list 200. The setting may be enabled or disabled by the client using management interface 124.

State flag—this setting allows the client to set control unit 108 to ignore state DNC list 202 for a particular state. Each of the 50 possible states may be individually ignored. The setting may be enabled or disabled by the client using management interface 124.

DMA flag—this setting allows the client to set control unit 108 to ignore DMA DNC list 204. The setting may be enabled or disabled by the client using management interface 124.

Intrastate flag—this exemption enables control unit 108 to allow intrastate communications connections to an individual state. For example, if a client believes they are entitled to an exemption allowing them to call into a state (i.e., origin and destination identifiers, e.g., telephone numbers, are from different states), the client may set this option to enable control unit 108 to override any other intrastate restrictions imposed by a state DNC list 202 or other list. The setting may be enabled or disabled by the client using management interface 124.

State Call Curfew flag—this exemption may allow control unit 108 to ignore the curfew restrictions associated with a particular state while following the federal call curfew rules. A call curfew may only allow communications connections within a designated time period such as 9 a.m. to 6 p.m. The federal call curfew rules may be more liberal than the curfew rules in certain states. Thus, the client has the option to follow the more liberal federal rules. The setting may be enabled or disabled by the client using a management interface 124.

The High Value customer (VIP) exemption list 222 may be a agent-specific list of destination identifiers that allows certain agents of a client to establish a communications connection with certain VIP clients. As stated previously, control unit 108 uses VIP DNC list 210 to prohibit a communications connection by agents of a client to certain VIP clients whose destination identifiers are contained in VIP DNC list 210. VIP exemption list 222 enables control unit 108 to bypass the VIP DNC list 210 check for a particular agent and allow that agent to contact the VIP customer. The destination identifiers may be stored in database 110 by the client using management interface 124. The VIP exemption list 222 check may also be enabled or disabled by the client at management interface 124.

Database 110 may also include other exemption lists 224 such as a Federal Grace Period List that defines a grace period wherein newly added destination identifiers to the Federal DNC list 200 may be contacted if they were added during the grace period. For example, the grace period may vary between 0 and 90 days. Control unit 108 may check the other exemption lists 222 such as the Federal Grace Period list depending on whether the check is enabled or disabled by the client using a management interface 124.

While the foregoing lists may preferably be implemented as tables within a database such as databases 110, the lists may also be distributed throughout multiple databases or multiple tables within multiple databases. Also, the prohibited and exempted destination lists within databases 110 may be modified by an agent via an origin 104 using IVR 116. Furthermore, the prohibited and exempted destination lists may be modified from a secondary interface such as management interface 124 or another remote connection to management units 112, typically using a WWW page interface by an agent or administrator.

Having described the various prohibited and exempted destination lists and other exemption lists in the foregoing, the mediation rules used by control unit 108 are now further described. These mediation rules preferably determine whether certain prohibited destination identifier lists are checked by control units 108 or bypassed (or ignored) based on whether certain exempted destination lists or exemption lists are used by control units 108. As described above, the client preferably configures control units 108 to use any combination of DNC lists and/or exemption lists within databases 110. Basically, the mediation rules determine the sequence of comparisons made by control units 108 between a destination identifier and one or more lists of exempted and prohibited identifiers. In that sequence, each comparison with a list of exempted identifiers by control units 108 determines whether a comparison with an associated list or lists of prohibited destination identifiers is bypassed or ignored.

For example, before comparing a destination identifier with Federal DNC list 200, State DNC lists 202, and DMA DNC list 204, control unit 108 typically compares the destination number with EBR exemption list 216. If there is a match with EBR exemption list 216, control unit 108 bypasses or ignores the result of the comparison with Federal DNC list 200, State DNC lists 202, and DMA DNC list 204. If the client, however, has configured the mediation rules to not use EBR exemption list 216, the control unit 108 compares the destination identifier to the Federal DNC list 200, State DNC lists 202, and DMA DNC list 204. Similarly, VIP exemption list 222 may be checked before control unit 108 checks VIP DNC list 210 to determine whether the VIP DNC list 210 check is bypassed or ignored. The DNC exemption list related to "Friends and Family" may be checked by control unit 108 to determine whether to bypass all other DNC lists. State DNC exemption list 220 may be checked prior to checking a particular State DNC list 202 to determine whether control unit 108 bypasses the particular State DNC list 202. Other check and bypass scenarios are possible depending on the mediation rules. Thus, the mediation rules, which are configured by the client, determine the sequence in which DNC lists may be bypassed or checked by control unit 108 in order to prohibit or allow a communications connection between an origin 104 and destination 106. FIG. 5, which will be discussed in detail later, provides a further illustration of the mediation rules.

In addition to being configured based on mediation rules that determine which prohibited and exempted destination lists or other exemptions are used, control unit 108 may use other information such as a client user identifier, client identifier, customer identifier, client office identifier, product identifier, geographic area, date, time, exemption type duration, origin identifier, internal client criteria, or internal customer criteria to determine whether a particular comparison with a prohibited or exempted destination list or other exemption list is necessary. In other words, control unit 108 may utilize additional information in conjunction with the prohibited and exempted destination lists of database 110 to prohibit or allow a communications connection to occur between an origin 104 and destination 106.

For example, a client agent may present a client user identifier with a password to enable control unit 108 to identify and authenticate the agent's access to the system. The client user identifier may also be used by control unit 108 to determine which particular DNC exemption list 218 to check for "Friends and Family" or which VIP exemption list 222 to check in order to determine whether the communications connection to a high value client should be allowed. Control unit 108 may also check the dialed number (DNIS) or origin identifier, e.g. telephone number, using Automatic Number Identification (ANI) to determine whether a particular agent is prohibited from making a communication connection with a destination having a particular area code according to DNC list 212. The client office identifier, which may also be determined by agent input from an origin 104 or automatically using ANI, may also be used, based on the mediation rules, to check DNC list 212 to determine whether a destination number is restricted.

Figure 3:
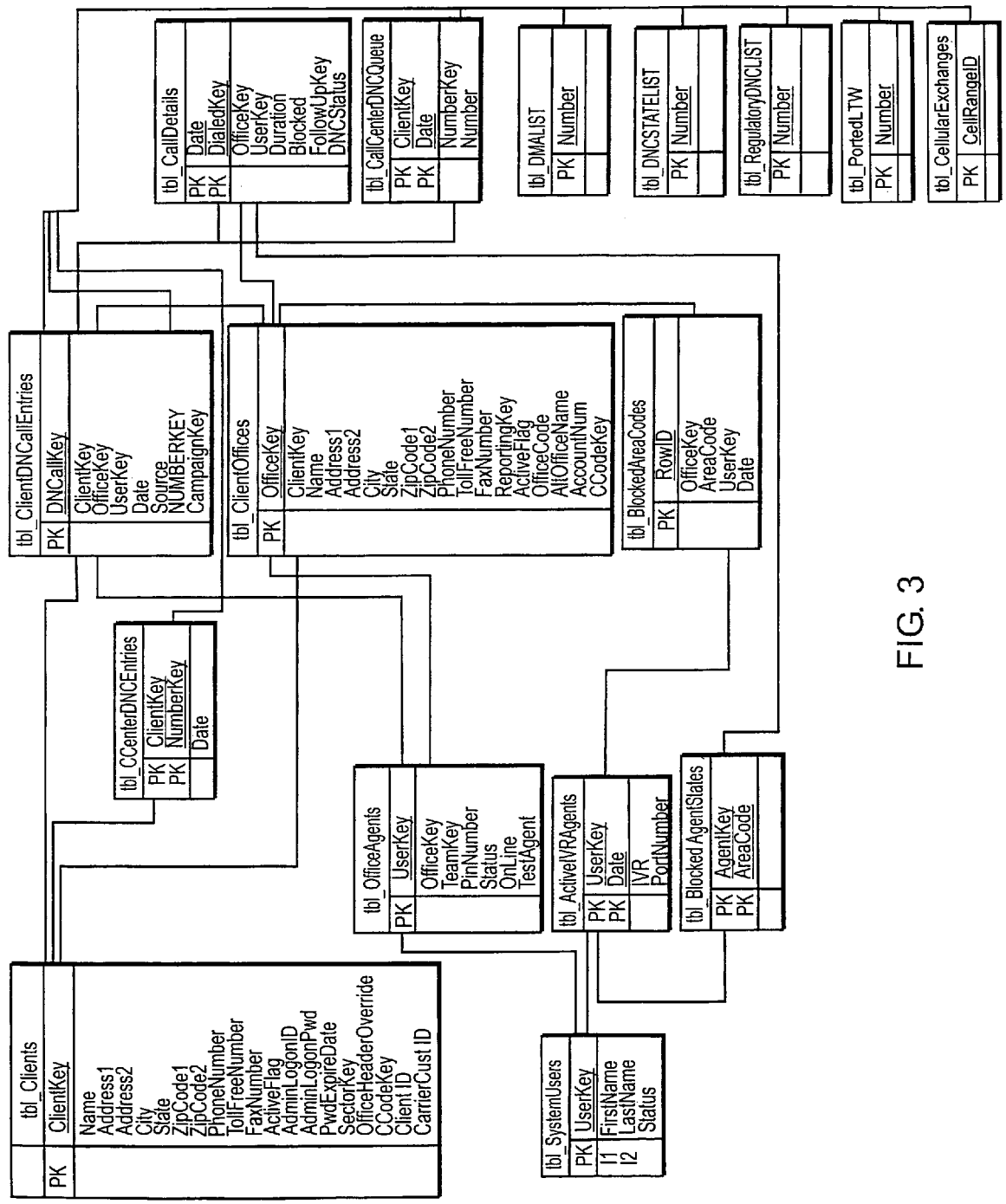
FIG. 3 is a block diagram of a DNC database that stores and manages DNC data for multiple clients.
Figure 4:
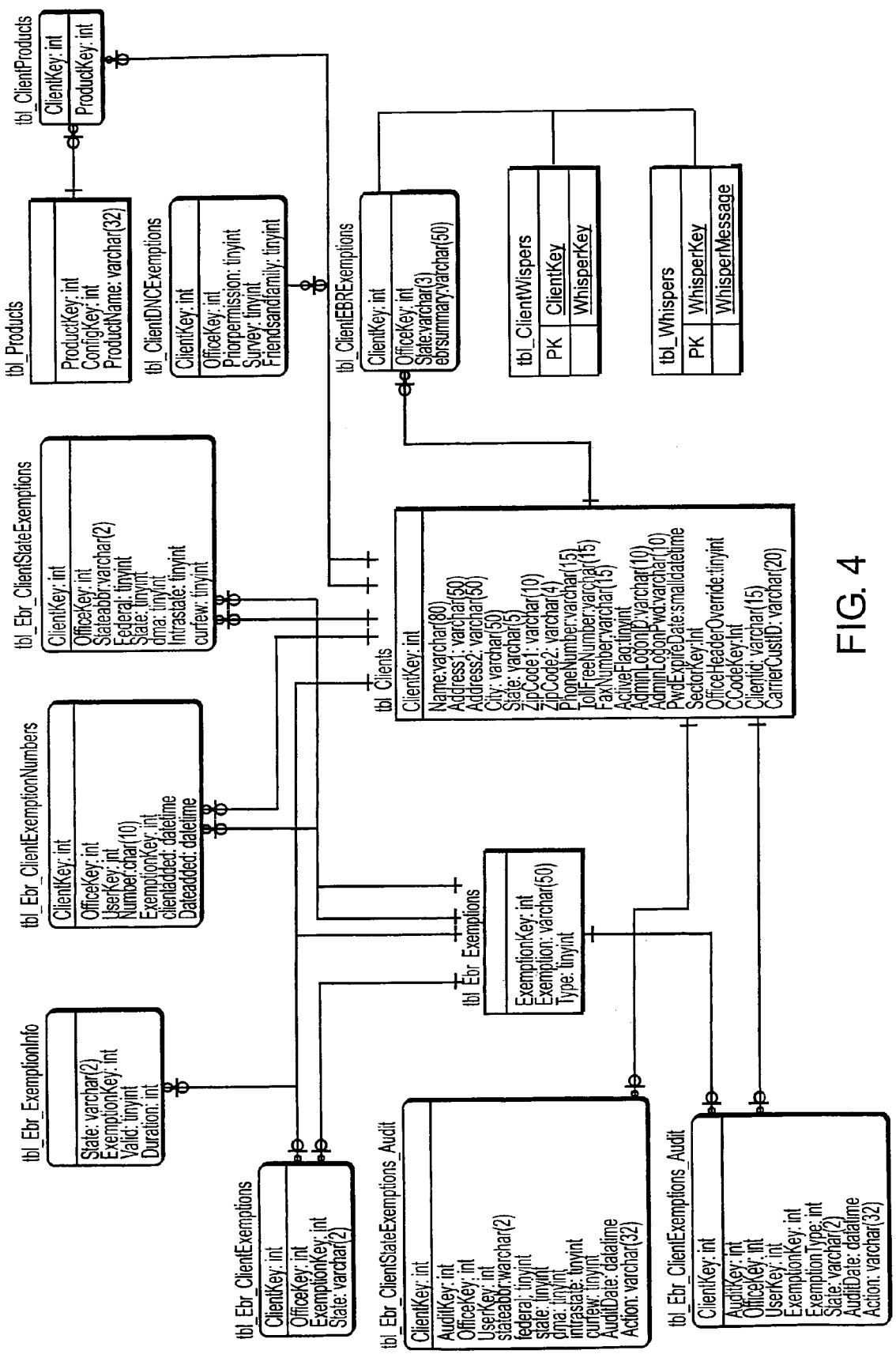
FIG. 4 is a block diagram of a DNC database that stores and manages exemption data for multiple clients.

FIGS. 3 and 4 show an exemplary internal organization of databases 110, which store client-specific specific information, individual office and agent details for each office assigned to the client, and common information for each client of control system 100. Each client is assigned a unique client key that identifies that client to control units 108. Individual client offices may also be assigned a unique office key. Furthermore, each client user or agent may be assigned a unique Personal Identification Number (PIN) and unique client user key. The client key, office key, and user key enable control units 108 to associate the proper prohibited and exempted destination lists to the proper client, client user, or office.

FIG. 3 shows the table organization of the data structure of databases 110 in which the prohibited destination lists are stored. The tables shown are described as follows:

tbl_Clients: a table of all clients using control system 100 including information about each client.

tbl_SystemUsers: a table of all individual users of control system 100 including client users or agents and administrators.

tbl_OfficeAgents: a table of all brokers. This table indicates whether the agent is part of a team, active, and online.

tbl_Active IVRAgents: a table of all agents currently signed on via IVR 116.

tbl_BlockedAgentStates: a table that enables control unit 108 to prohibit certain agents from calling certain states listed in the table.

tbl_BlockedAreaCodes: a table that enables control unit 108 to prohibit certain agents from calling certain area codes.

tbl_ClientOffices: a table of offices assigned to a particular client.

tbl_CCenterDNCEntries: a table that lists the prohibited destination identifiers for a particular call center.

tbl_ClientDNCCallEntries: a table that lists the prohibited destination identifiers for a particular client 208.

tbl_CallDetails: a table that stores details associated with each call to enable logging or auditing.

tbl_CallCenterDNCQueue: a table that stores the database changes that must be sent to other management units 112.

tbl_DMALIST: a table that stores the DMA DNC list 204.

tbl_DNCSTATELIST: a table that stores the state DNC lists 202.

tbl_RegulatoryDNCList: a table containing Federal DNC list 200.

tbl_CellularExchanges: a table that stores the standard identified range of cell phone numbers 226.

tbl_PortedLTW: a table that stores phone numbers which have been ported to a cell phone device 228.

FIG. 4 shows the table organization of the data structure of databases 110 in which exempted destination identifiers are stored. The tables shown are described as follows:

tbl_Clients: a table of all clients using control system 100 including information about each client (same as in FIG. 3).

tbl_Ebr_Exemptioninfo: a table that stores the durations associated with each category exemption.

tbl_Ebr_ClientExemptions: a table that stores exemptions associated with a particular client.

tbl_Ebr_ClientStateExemptions_Audit: a table that stores an audit record of exemptions associated with State DNC exemption list 220.

tbl_Ebr_ClientExemptions_Audit: a table that stores an audit record of exemptions associated with DNC exemption list 218.

tbl_Ebr_Exemptions: a table that describes the EBR exemption of EBR exemption list 216.

tbl_Ebr_ClientExemptionNumbers: a table that stores the list of destination identifiers in EBR exemption list 216 including the exemption key and date of contact information.

tbl_Ebr_ClientStateExemptions: a table that stores the exemption listed in State DNC exemption list 220 associated with a particular client.

tbl_ClientDNCExemptions: a table that stores the DNC exemption list 218 associated with a particular client.

tbl_EBRExemptions: a table that describes that State EBR exemptions.

tbl_Products: a table that describes a product associated with a particular client.

tbl_ClientProducts: a table that associates a product key to a particular client.

tbl_ClientWhispers: a table that stores client specific whisper messages 230.

tbl_Whispers: a table that stores system defined whisper messages 232.

As shown above, the databases 110 are configured using tables such that prohibited and exempted destination lists may be dynamically added or removed. For example, new EBR exemptions may be added to tbl_Ebr_Exemptions with minimal or no modifications to other tables within databases 110. Such flexibility to enable databases 110 updates also allows the mediation rules to be flexibly adapted to continuously support new connection prohibition rules.

Referring again to FIG. 1, the functionality of control units 108 and associated databases 110 may also be implemented as a software application within a remote client computer 126. Alternatively, only control unit 108 may be implemented within client computer 126 while it remotely accesses the prohibited and exempted destination lists within database 110-3, located in a central administration facility. Furthermore, computer 126 may act as a remote interface to any management unit 112. The lower cost implementation may be attractive to certain clients that may not be concerned with the possible latency in accessing database 110-3. In this scenario, client computer 126 acts as both a connection unit and control unit by allowing or prohibiting a communications connection between, for example, origin 104-6 and 106-1 based on the prohibited and exempted destination lists within an internal database 110, or within central database 110-3, or within another remote database. Computer 126, acting as a control unit, may also control the communications connection between origin 104-6 and destination 106-5 which could be a Voice-over-IP (VoIP) connection.

With regard to any control unit 108, it is understood that a plurality of destination identifiers may be examined in relation to a particular origin to determine whether to prohibit or allow a communications connection between a particular origin such as origin 104-2 and each destination of the plurality of destinations 106. Thus, control units 108 may be continuously processing communications connection requests as the client agent attempts to make new contacts with new customers.

Another feature of control system 100 is that management units 112 may maintain audit records of communications connections whether the connection is prohibited or allowed. Instead of simply bypassing a particular check if an associated exemption list check has a match to a destination identifier, control units 108 may perform the check, but only log the results. These logs of prohibited, allowed, and improper destination identifiers may be stored for later analysis or other purposes. The logs may be stored as a flat, excel, or dbf file or the like.

According to the foregoing, the present approach provides a method of selectively prohibiting a communications connection between an origin and destination in a communications network. The method includes receiving or initiating a connection request for a communication connection between an origin 104 and destination 106 that includes the destination identifier and prohibiting or allowing the requested communications connection based on one or more mediation rules and lists of prohibited and exempted destination identifiers in databases 110.

Figure 5A:
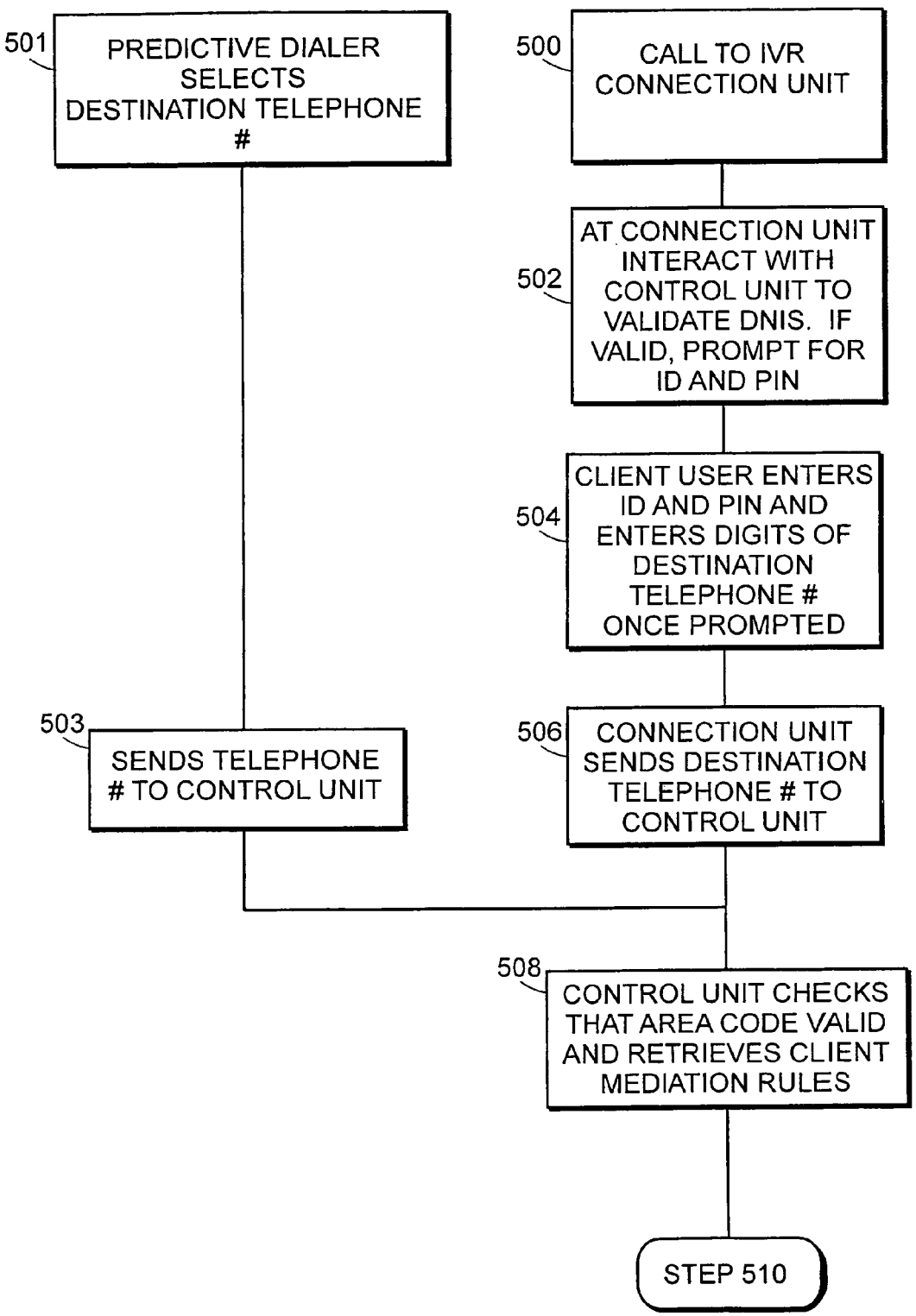
FIGS. 5A-5C is a flow chart of a procedure for prohibiting or allowing a communications connection in accordance with principles of the invention.
Figure 5B:
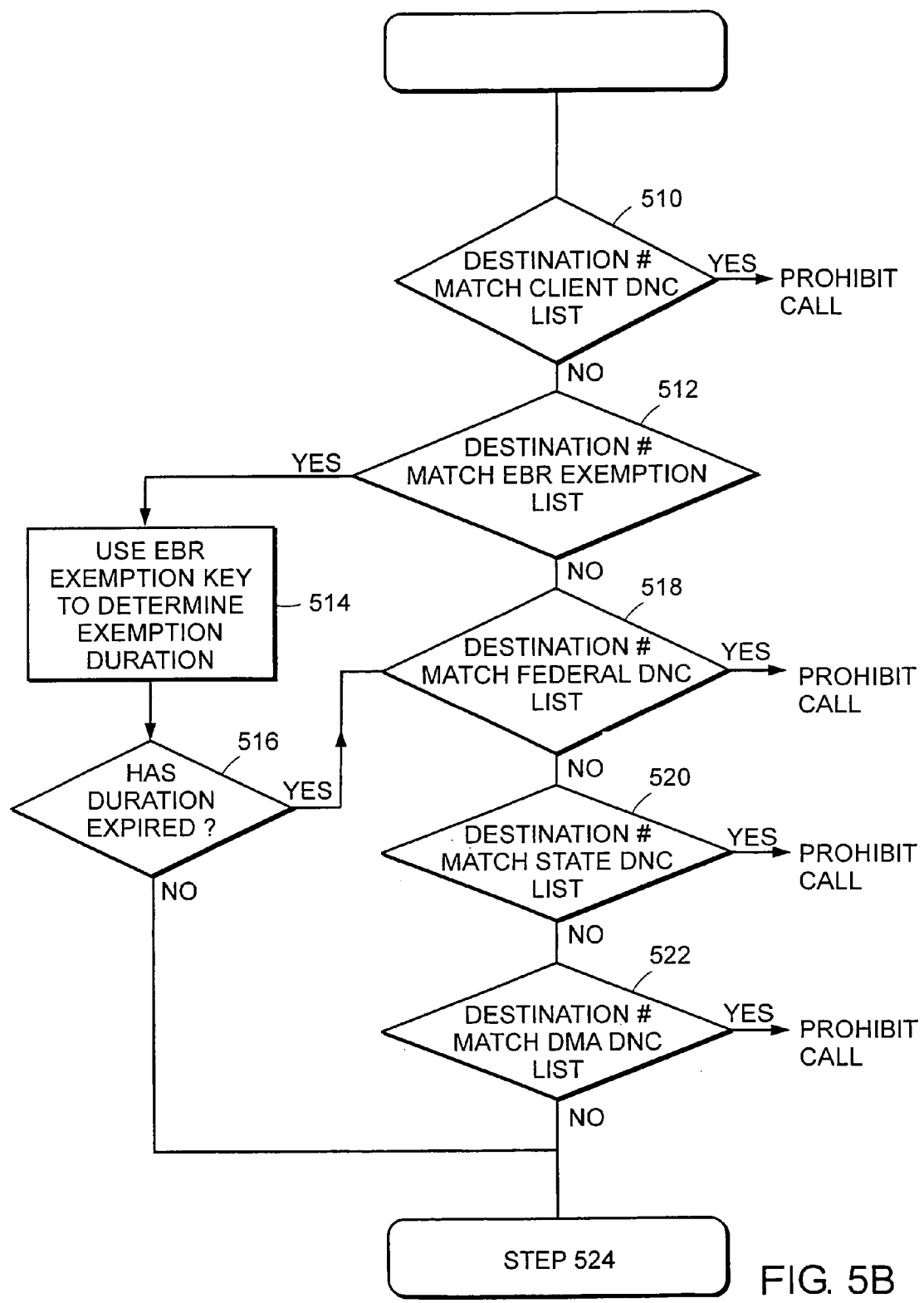
Figure 5C:
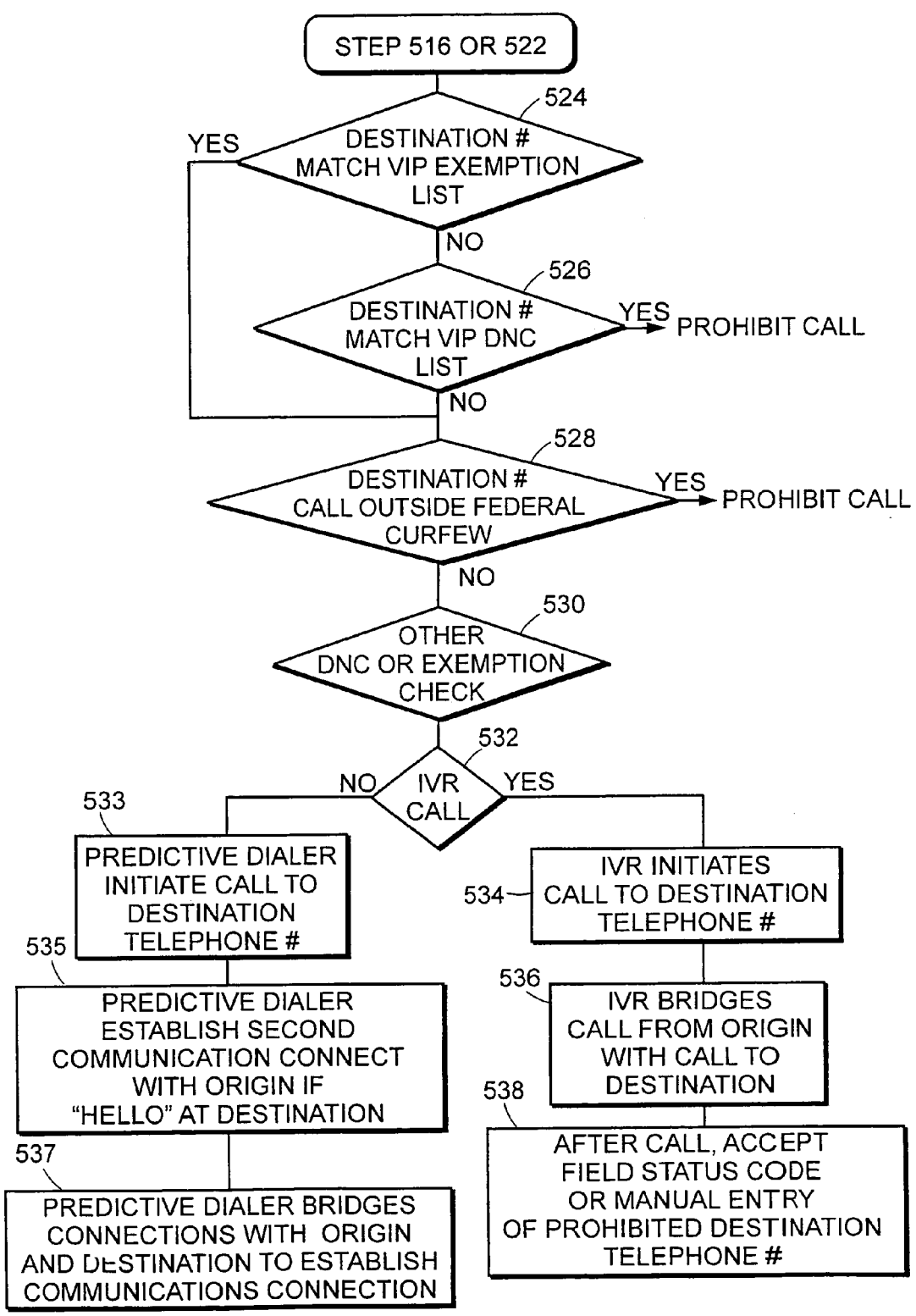

FIGS. 5A-5C illustrate one example process for selectively prohibiting a communications connection between, for example, origin 104-1 and destination 106-1 in a telecommunications network using PSTN 102 wherein origin 104-1 is a telephone having a user interface that accepts voice and dialed digits from a client agent. Initially, the agent calls IVR 116 at connection unit 114-1 to establish a communications connection with a connection unit 114-1 (Step 500). Connection unit 114-1 then interacts with a control unit 108-1 to validate the dialed number using DNIS. Upon successful validation by control unit 108-1, connection unit 114-1 prompts the client agent for identification and authentication information (Step 502). The prompt may be a voice recording or particular tone. Once prompted, the agent enters the identification and authentication information such as an agent identifier and PIN or client office identifier. Again, control unit 108-1 validates the identification and authentication information. Upon successful validation by control unit 108-1, IVR 116 of connection unit 114-1 prompts the agent for the destination telephone number. Further details regarding the initial steps of this process are provided in International Patent Application PCT/US03/19145. The client agent enters the digits associated with a destination telephone number (Step 504). The connection unit 114-1 then sends the destination telephone number to the control unit 108-1 (Step 506). Control unit 108-1 verifies that the dialed area code of the destination telephone number is valid and retrieves client-specific mediation rules (Step 508).

Control unit 108-1 prohibits or allows the communications connection based on the mediation rules, one or more prohibited destination number lists, and one or more exempted destination number lists, by sending a prohibit or allow order to the connection unit 114-1 based on the following sequence of checks. The destination telephone number is compared with client DNC list 208. If there is a match, control unit 108-1 orders connection unit 114-1 to prohibit the call (Step 510). If there is no match, the destination telephone number is compared with EBR exemption list 216 (Step 512). If there is a match, the EBR exemption key is checked to determine the category of exemption and the duration of time that the category of exemption is valid (Step 514). Control unit 108-1 also checks the date of contact and compares it with the current date to determine whether the exemption duration has expired. If the duration has expired, control unit 108-1 returns to checking the Federal, State, and DMA DNC lists. If the duration has not expired, control unit 108-1 either ignores or bypasses the checks of the Federal, State, and DMA DNC lists (Step 516).

If the destination telephone number does not match a number in EBR exemption list 216, the destination telephone number is compared with the Federal DNC list 200 (Step 518). If there is a match, the call is prohibited. If there is no match, the destination telephone number is compared with the designated state lists with State DNC list 202 (Step 520). If there is a match, the call is prohibited. If there is no match, the destination telephone number is compared with the DMA DNC list 204 (Step 522). If there is no match, the destination telephone number is compared with VIP exemption list 222 (Step 524). The VIP exemption list may be agent specific. If there is a match, the VIP DNC check is bypassed or ignored. If there is no match, the destination telephone number is compared with the VIP DNC list 210 (Step 526). If there is a match, the call is prohibited. If there is no match, the destination telephone number is compared with a Federal Curfew to determine whether the time of day (TOD) of the current call is within the federal government curfew times at the destination (Step 528). If the State Curfew were selected in the mediation rules, a State curfew check would have been made also. If the time is inside the allowed curfew period, for example 9 a.m. to 7 p.m., the call is not prohibited and other exemption checks or do-not-call checks may be made as defined by the mediation rules (Step 530).

Once control unit 108-1 completes all comparisons of the destination telephone number based on the mediation rules and the destination number has been allowed, control unit 108-1 orders connection unit 114-1 to allow the communications connection whereupon IVR 116 of connection unit 114-1 initiates a communications connection to destination 106-1 using the destination telephone number (Step 534). Connection unit 114-1, using IVR 116, then bridges the call from origin 104-1 with the call to destination 106-1 (Step 536). After the call is completed, IVR 116 may accept field status codes or manual entry of a prohibited destination telephone number for addition to client DNC list 208 (Step 538). Further details regarding the status codes or manual entry are provided in International Patent Application PCT/US03/19145.

If control unit 108-1 completes all comparisons of the destination telephone number based on the mediation rules and determines that the communications connection is prohibited, control unit 108-1 orders IVR 116 of switch 114-1 to end or disconnect the communications connection with origin 104-1. Instead of ending the connection with origin 104-1, IVR 116 may notify the client agent at origin 104-1 that the call is prohibited and prompt the agent for entry of another destination telephone number. The next destination telephone number may then be checked using the process described above.

The preceding steps associated with a call initiated to IVR 116 are similar to the steps involving a predictive dialer such as connection unit 114-2. A predictive dialer is a device or system that continuously initiates calls to destinations 106 and establishes a connection with an origin such as origin 104-9 only after establishing a connection with a destination such as 106-1. Thus, as shown in FIG. 5A, connection unit 114-2, a predictive dialer, initially selects a destination telephone number (Step 501). Connection unit 114-2 then sends the destination telephone number to control unit 108-2 for permission to prohibit or allow a communications connection between, for example, origin 104-9 and destination 106-1. Control unit 114-2 then performs the same or similar sequence of checks as control unit 114-1 performed previously to prohibit or allow the communications connection between origin 104-1 and 106-1. If the destination telephone number is allowed, control unit 108-2 orders connection unit 114-2 to allow the communications connection between origin 104-9 and destination 106-1.

Connection unit 114-1 then initiates a call to destination 106-1 using the destination telephone number (Step 533). If connection unit 114-2 detects a "Hello" from destination 106-1, connection unit 114-2 establishes a second connection with origin 104-9 (Step 535). Connection unit 114-2 then bridges the connections with origin 104-9 and 106-1 to establish a communications connection between them.

Referring again to FIG. 1, as an alternative approach to performing real-time or near real-time call control as described above, an analysis system may be used to selectively designate whether a communications connections between an origin and one or more destinations are prohibited. The analysis system typically includes an interface unit that receives one or more proposed destination identifiers. The analysis system also includes at least one list of prohibited destination identifiers, at least one list of exempted destination identifiers, and an analysis unit 128 that designates whether the communication connection between an origin and one or more proposed destinations are prohibited or allowed based on one or more mediation rules and the list of prohibited and exempted destination identifiers.

The functional capabilities of analysis units 128 may be identical to control units 108 except that analysis units 128 do not control a communication connection or connection units 114. In fact, control units 108 may also function as analysis units. Instead of performing a real-time action, analysis units 128 may designate which destinations 106 may be connected with which origins 104. This designation of prohibited or allowed communications connections may entail analyzing a certified list of proposed destination identifiers delivered to the analysis unit via an interface unit such as personal computer 130. Computer 130 may also have an application that streamlines the information sent to analysis unit 128-1 such that private information associated with a destination is not potentially exposed in transmission to analysis unit 128-1. The interface unit could also be a ftp server, an database connection, a remote terminal connection, a WWW page, or Interactive Voice Response connection residing within analysis unit 128-1 or another server such as communications server 132.

After designating which communications connections are prohibited and allowed, analysis unit 128-1 may send a designation list to the client computer 130. Alternatively, analysis unit 128-2 may be implemented as a software application within a remote client computer 130. Thus, analysis unit 128-2 remotely accesses the prohibited and exempted lists of database 110-3 within a central administration facility. Personal computer 130 may also contain a database 110 that eliminates the need for analysis unit 128-2 to remotely access other databases such as database 110-3.

According to the foregoing, the present approach provides a method of selectively designating whether communications connections between an origin and one or more destinations in a communications network are prohibited. The method includes receiving one or more destination identifiers and designating whether the communications connection between the origin 104 and one or more destinations 106 are prohibited or allowed based on one or more mediation rules and lists of prohibited and exempted destination identifiers.

Figure 6:
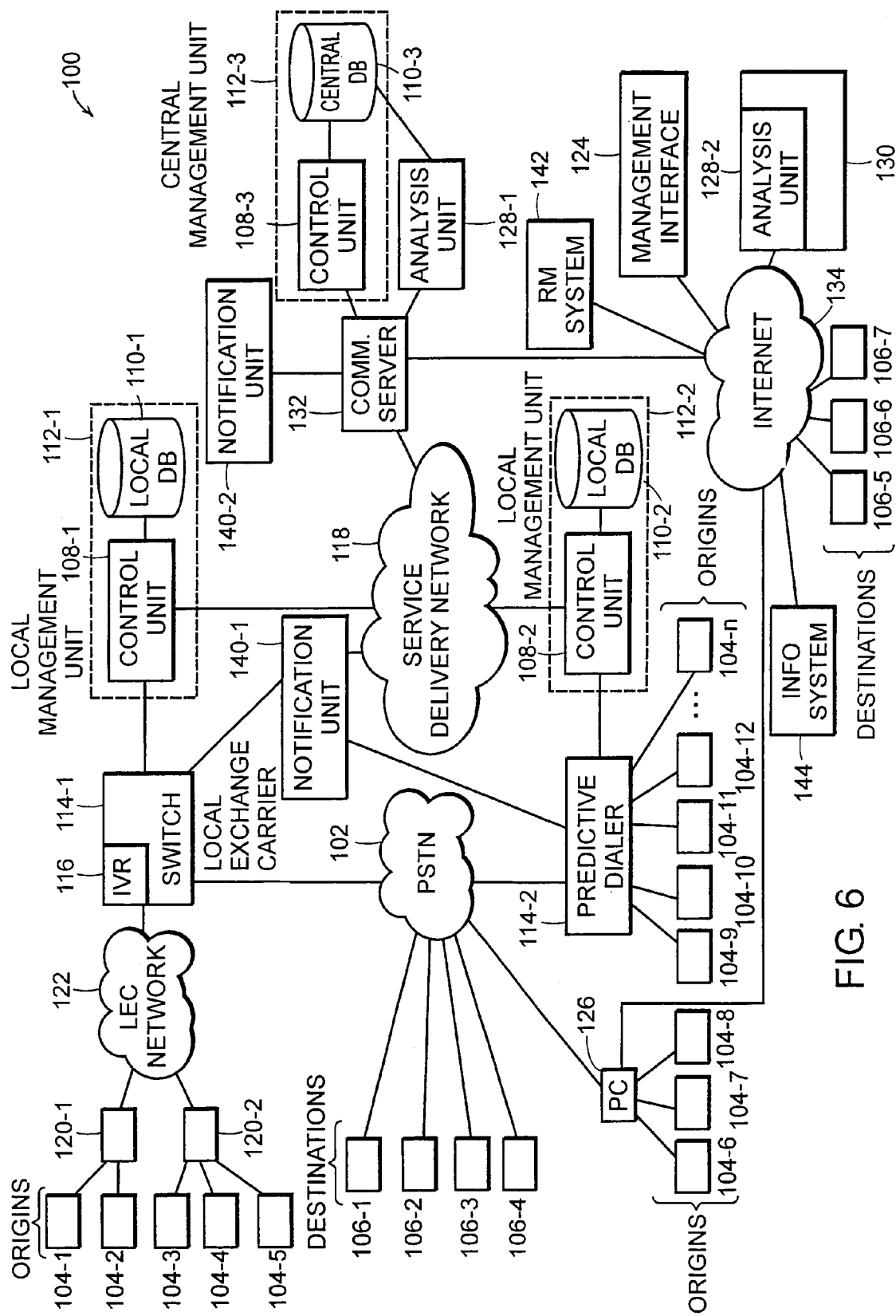
FIG. 6 is a schematic diagram showing a communications control and notification system according to the principles of the present invention.

Referring to FIG. 6, another embodiment includes a control system 100 for selectively establishing a communications connection between an origin 104 and destination 106 within a communications network including telecommunications network 102 where the communications connection is typically established by a connection unit 114 that bridges a first connection with the origin 104 with a second connection with the destination 106. The system preferably includes at least one list of prohibited destination 106 identifiers, at least one list of exempted destination 106 identifiers, and a control unit 108 that orders the connection unit 114 to establish the communications connection between an origin 104 and destination 106 based on one or more mediation rules and the lists of prohibited and exempted destination 106 identifiers.

The control unit 108 may also deliver one or more notification messages to either or both an origin 104 and destination 106. The notification messages may be delivered to an origin 104 from a connection unit 114 using the first connection either before the communications are established with the destination 106, during established communications with the destination 106, or after communications have ended with the destination 106. The notification messages may also be delivered to a destination 106 from a connection unit 114 using the second connection either before the communications are established with an origin 104, during established communications with an origin 104, or after communications have ended with an origin 104. The notification message may indicate to the origin 104 user which exemption is being applied by the control system 100 as determined by the mediation rules and at least one list of exempted destination 106 identifiers.

For example, a client agent may initiate a call to IVR 116 of connection unit 114-1 in order to reach a contact user of destination 106-1. After the communications connection between origin 104-1 and connection unit 114-1 is established, control unit 108-1 typically determines whether to allow the communications connection with a particular destination 106-1 based on the mediation rules. If, for instance, control unit 108-1 determines that an EBR exemption such as a prior "purchase" by the contact applies, even though the destination 106-1 identifier is on the federal DNC list 200, connection unit 114-1 via IVR 116 may deliver an audio recording to origin 104-1 stating that "The contact is on the Federal DNC list, but the call is allowed based on a prior purchase." The message may even specify the purchased item, location of purchase, and purchase date. After the message is played, connection unit 114-1 may then initiate a second communications connection with destination 106-1. This capability, otherwise known as a "whisper" feature, advantageously prepares an agent for a possibly negative query from the contact for an explanation as to why the agent may not be adhering to a federal, state, or other DNC law.

Because IVR 116 typically has separate, i.e., first and second, connections with origin 104-1 and destination 106-1, an audio or other type of message may be delivered to origin 104-1 without the message being detected by the contact user of destination 106-1, even while the first and second connection are bridged together by connection unit 114-1. Thus, the previous message may be delivered to origin 104-1 after connection unit 114-1 bridges the first and second connections.

For the period of time that the first connection exists between origin 104-1 and connection unit 114-1, notification messages may be sent to origin 104-1. For the period of time that the second connection exists between connection unit 114-1 and destination 106-1, notification messages may be sent to destination 106-1. Thus, even if one of the two connections ends, the other connection may allow notification messages to be sent.

For example, after a contact user of destination 106-1 completes a call with an agent or even during the communications connection, a notification message may be sent to the destination 106-1 that states "Please rate your experience with this agent on a scale of one through five with five being the highest." IVR 116 may use a DTMF detector that captures the digit pressed by the contact user at destination 106-1 in response to the notification message query. A notification message may request information from either or both the origin 104-1 or destination 106-1. Thus, one or more notification messages may initiate or be part of an interactive information exchange process.

The notification message may be any one or combination of an audio recording, interactive voice response, human-initiated voice message, text message, electronic mail message, instant message, multimedia message, IP-based message, audio tone, sequence of audio tones, visual indicator, or a graphical image. For instance, a VoIP-capable origin 104 may have a graphical user interface (GUI) that allows notification messages to be received as text messages, Hypertext Markup Language (HTML) pages or Extensible Markup Language (XML) data while also receiving audio notification messages. Certain origin 104 devices may have light emitting diode (LED) panels that may provide a notification message in the form of a visual indicator to the agent user of the origin 104 device.

A notification message, however, may include information not based on the mediation rules such as information derived from any one of or combination of client-specific requirements, origin agent-specific requirements, and destination user-specific requirements. Because control units 108 typically verify the identity of an agent user of an origin 104, notification messages may be tailored to information associated with the agent. For example, when an agent using an origin 104 initiates a communications connection request and the connection between an origin 104 and connection unit 114 is established, a control unit 108 may send agent-specific information to the origin 104 such as a meeting alert with the agent's supervisor, amount of contact calls made, reminder to update the agent's password, etc. . . . . . The amount and type of messages is dependent on the agent and his company's needs. A variety of messages may be available to destination 106 contacts to enable evaluation of agents, provide disclaimers automatically, or possibly deliver targeted advertisements.

The notification message may be delivered in-band through a connection unit 114 or out-of-band through some other medium to an origin 104 or destination 106. While in-band typically applies to notification messages sent within a circuit-switched connection, it also applies, in this embodiment, to notification messages sent to origins 104 and destinations 106 using the same medium through which the communications are being exchanged between an origin 104 and destination 106. On the other hand, an out-of-band notification message may be sent to an origin 104, for example origin 104-6 using another medium than the communications connection medium being use between the origin 104-6 and a destination 106 such as 106.1. For example, if origin 104-6 and destination 106-1 have established a telecommunications connection, control unit 108-2 may send an out-of-band notification message in the form of an IP-based Extensible Markup Language (XML) data message via service delivery network 118, communications server 132, Internet 134, and personal computer 126, assuming that origin 104-6 also has a text-capable GUI and Internet 134 connectivity.

In yet another embodiment, an analysis unit 128 may provide one or more notification messages associated with one or more proposed communication connections. When an interface unit such as personal computer 130 delivers a certified list of proposed destination 106 identifiers to analysis unit 128-2, analysis unit 128-2 may designate allowed destination identifiers and return a designation list to personal computer 130 that includes one or more notification messages. These notification messages are typically associated with particular destination 106 identifiers and preferably provide relevant information associated with each destination 106 identifier. For example, the designation list may have a remarks column that includes notification messages, each notification message being associated with a particular destination 106 identifier on the designation list. Thus, when an agent attempts to solicit a contact, the agent may read the remarks column to determine which exemption is being used to allow the proposed communications connection. An analysis unit 128 may also generate logs of allowed destination 106 identifiers and associated notification messages with each destination 106 identifier.

A further embodiment may be a notification system for delivering messages to an origin 104 and destination 106 of a communications connection in a communications network including telecommunications network 102. The notification system may include a connection unit 114 that establishes a first connection with an origin 104 and a second connection with a destination 106 and then bridges the first and second connections to establish a communications connection between a particular origin 104 and destination 106. The notification system may also include a notification unit 140-1 that delivers at least one notification message to either or both an origin 104 and destination 106. For example, when an agent initiates a communications connection using origin 104-1 with IVR 116, notification unit 140-1 may send a notification message associated with a particular destination 106 such as destination 106-4 to origin 104-1 via IVR 116 of connection unit 114-1 in the form of an audio message that states "The contact is a VIP customer." Notification unit 114-1 may interface with a database such as database 112-3 to determine the destination 106-4 status, but may not control the communications connection as a control unit 108 such as control unit 108-1.

Figure 7:
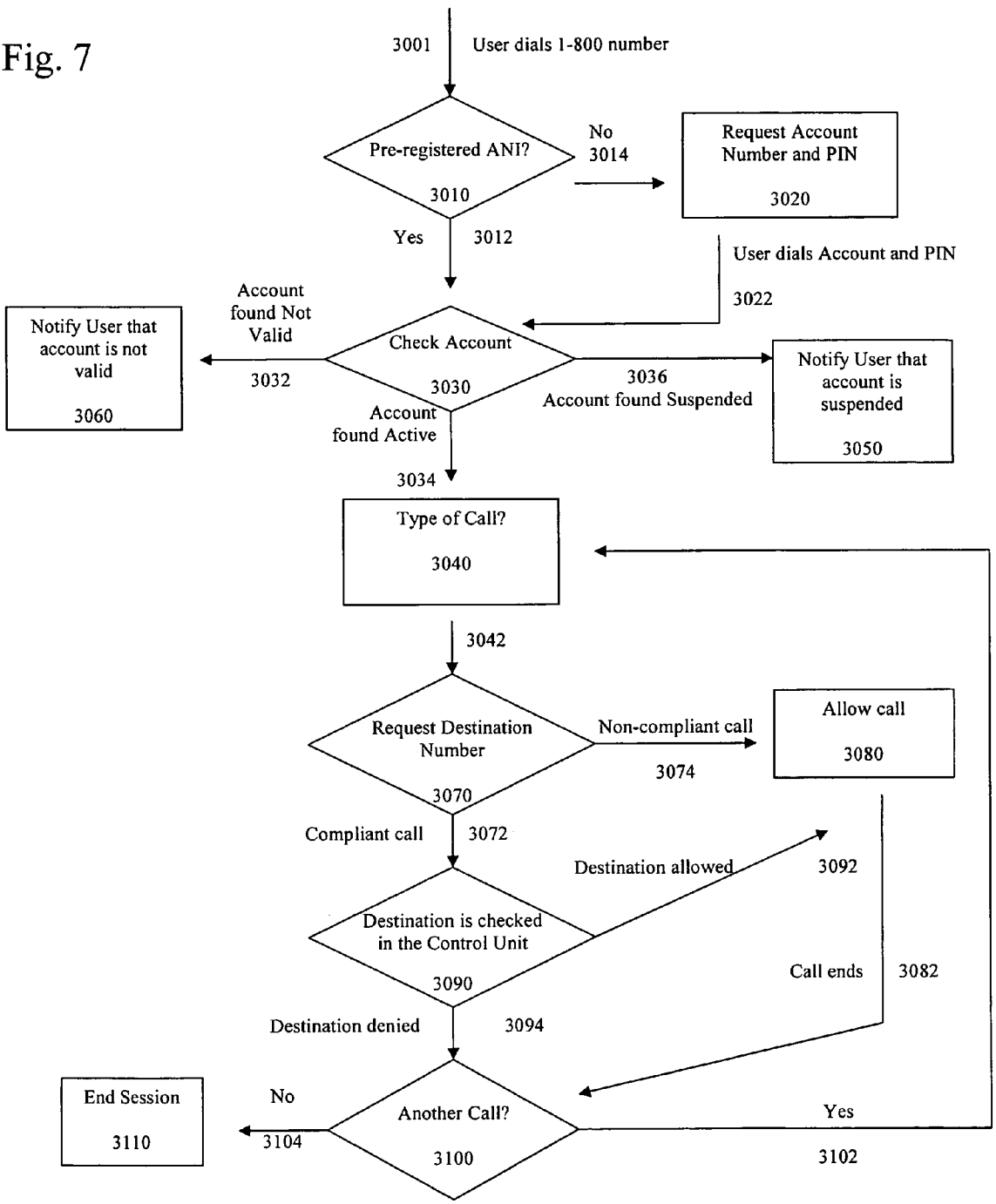
FIG. 7 is a flow diagram illustrating a process of providing communications control treatment through calling card access according to an embodiment of the present invention.

FIG. 7 illustrates a scenario that defines the call flow according to the principles of an alternate embodiment of the present invention:

A customer dials into the system using the access number provided, such as a 1-800 number 3001.

At 3010, the system determines whether the incoming call is from a pre-registered ANI. If the user is calling from a pre-registered ANI number 3012, the user is considered authenticated and moves on to step 3030. If the user is not calling from a pre-registered ANI number 3014, the user is prompted to enter their account number PIN for authentication, 3020. After the user enters the account number and PIN 3022, the user moves to step 3030.

At 3030, the user account is checked. If the account is active (not suspended or terminated) 3034, the user is allowed to proceed to the next step in the call process 3040. If the account is suspended 3036, an announcement may be played to notify the user that the account is suspended and that the user should visit a web page to re-activate the account 3050. If the account is terminated 3032, an announcement may be played to notify the user that the account is not valid 3060.

Once the account is found active, at 3040 the user may be prompted to enter the type of call (e.g. controlled call, non-controlled call). Once the user enters the type of call, they may now be considered connected to the system, and service usage or connectivity charges may begin depending on the type of call selected.

At 3070, the user is prompted to enter a phone number to be called. If the user had previously opted to make a non-controlled call 3074, the phone call is allowed 3080. If the user had previously opted to make a controlled call 3072, the destination is checked in the control unit 108, such one shown in FIG. 1, to determine if the call is permitted 3090.

If the call is permitted 3092, the call is attempted 3080. If the control unit determines that the call is not permitted, an announcement indicates that the destination has been denied 3094. After a call has been denied 3094, or after an allowed phone call ends 3082, the user is prompted to indicate whether another call is to be made 3100.

If the user indicated that they would like to place another call, they are prompted again to enter the type of call 3040, and the call treatment follows as described above. If the caller indicates they do not want to place another call, the session ends. Alternatively, the caller can cancel the session at any point, by placing the phone on the hook.

It will be understood to one skilled in the art that variations of the call flow described above with reference to FIG. 7 may exist that fall within the principles of the present invention. Other features, to the call flow may be incorporated. For example, the account may be debited for usage charges during the session at an appropriate interval. In addition, if the account balance is approaching $0, a "whisper" announcement may be provided to the caller to advise them of their low account balance. If the balance goes below, the user may be disconnected under certain circumstances.

Referring again to FIG. 1, the functionality of control units 108 and associated databases 110 may also be implemented as a software application within a remote client computer 126. Alternatively, only control unit 108 may be implemented within client computer 126 while it remotely accesses the prohibited and exempted destination lists within database 110-3, located in a central administration facility. Furthermore, computer 126 may act as a remote interface to any management unit 124. The lower cost implementation may be attractive to certain clients that may not be concerned with the possible latency in accessing database 110-3. In this scenario, client computer 126 acts as both a connection unit and control unit by allowing or prohibiting a communications connection between, for example, origin 104-6 and destination 106-1 based on the prohibited destination lists within an internal database, or within central database 110-3, or within another remote database. Computer 126, acting as a control unit, may also control the communications connection between origin 104-6 and destination 106-5 which could be a Voice-over-IP (VoIP) connection.

As stated previously, notification messages need not be based on the mediation rules and may originate from a notification unit 140, a relationship management system 142 such as a customer relationship management system (CRM), a control unit 108, or some other information system 144.

It will be apparent to those of ordinary skill in the art that methods involved in the present invention may be embodied in a computer program product that includes a computer usable medium. For example, such a computer usable medium may consist of a read only memory device, such as a CD ROM disk or conventional ROM devices, or a random access memory, such as a hard drive device or a computer diskette, having a computer readable program code stored thereon.

While this invention has been particularly shown and described with references to preferred embodiments thereof, it will be understood by those skilled in the art that various changes in form and details may be made therein without departing from the scope of the invention encompassed by the appended claims.

For example, in the foregoing description of the invention and various embodiments thereof, the term "communications connection" is intended to include circuit-switched communications, packet-switched communications, communications using connectionless protocols such as IP, virtual circuit, or another electronic communications between an origin and destination.

What is claimed is:

1. A method of providing call compliance, the method comprising:
receiving at a connection unit a call from a caller on an incoming connection of the connection unit;
receiving an authentication number from the caller on the incoming connection;
verifying at a computer server the authentication number against an account database to evaluate corresponding account information;
enabling at the computer server the caller on the incoming connection to initiate an outgoing call on an outgoing connection based on the account information;
receiving over the incoming connection an identifier of a destination to which a call is to be initiated over the outgoing connection;
providing at the computer server call compliance treatment to the outgoing call to the destination; and
updating at the computer server the account information based on the outgoing call.

2. The method of claim 1 wherein the authentication number is a pre-registered ANI.

3. The method of claim 1 wherein the authentication number is an account number and a corresponding PIN.

4. The method of claim 1 wherein the call compliance treatment comprises:
checking a do-not-call database for an indication of whether the destination is a do-not-call destination;
if it is determined that the destination is a do-not-call destination, blocking the outgoing call from taking place over the outgoing connection; and
if it is determined that the destination is not a do-not-call destination, allowing the outgoing call to take place over the outgoing connection.

5. The method of claim 4, wherein the call compliance treatment occurs at a central switching facility or a distributed access facility.

6. The method of claim 1, wherein receiving said call includes receiving a telephone call from the caller.

7. The method of claim 4, wherein the identifier is a telephone number of the destination.

8. The method of claim 7, wherein checking the do-not-call database for an indication of whether the destination is a do-not-call destination includes determining whether the called telephone number is present in the do-not-call database and if present, treating the destination as a do-not-call destination.

9. The method of claim 4, further comprising, if it is determined that the destination is not a do-not-call destination and after allowing the call to take place, monitoring the call for an occurrence of an update signal.

10. The method of claim 9, further comprising, if it is determined that the destination is not a do-not-call destination and after allowing the call to take place, monitoring the call for an occurrence of an update signal from the caller, said update signal being an indication to identify said destination as a do-not-call destination in said database.

11. The method of claim 10, further comprising, if it is determined that the destination is not a do-not-call destination and after allowing the call to take place, detecting an update signal from the caller and in response to detecting said update signal, identifying said destination as a do-not-call destination in said database.

12. The method of claim 4, wherein the incoming connection is a 1-800 line, a local access number or any other means of access.

13. The method of claim 4, further comprising:
enabling the caller on the incoming connection to initiate a next outgoing call;
receiving over the incoming connection a next identifier of a next destination to which the next outgoing call is to be initiated;
checking the do-not-call database for an indication of whether the next destination is a do-not-call destination;
if it is determined that the next destination is a do-not-call destination, blocking the outgoing call from taking place; and
if it is determined that the next destination is not a do-not-call destination, allowing the outgoing call to take place.

14. The method of claim 1, further comprising charging fees to the account based on the length of the incoming or outgoing call or both.

15. The method of claim 1, wherein receiving an identification number from the caller further comprises receiving an indication to exempt an outgoing call from call compliance treatment.

16. The method of claim 15, further comprising charging fees to the account based on a combination of any of a periodic maintenance fee, the call treatment, length of the incoming call and length of the outgoing call.

17. The method of claim 1 further comprising providing any of a web based interface, live operator, and mail to activate an account and its corresponding account number.

18. A method of implementing call compliance at a central facility, said method comprising:

receiving at a connection unit a call from a caller on an incoming connection of the connection unit;

receiving an authentication number from the caller on the incoming connection;

verifying at a computer server the authentication number against an account database to determine whether a corresponding account is active;

enabling at the computer server the caller on the incoming connection to initiate a plurality of outgoing calls from the central facility if the account is active;

receiving over the incoming connection a plurality of identifiers of destinations to which calls are to be initiated from the central facility;

at the computer server, for each of the plurality of identifiers:
(1) checking a do-not-call database for an indication of whether the destination for that received identifier is a do-not-call destination;
(2) if it is determined that the destination for that received identifier is a do-not-call destination, blocking the outgoing call from taking place; and
(3) if it is determined that the destination for that received identifier is not a do-not-call destination, allowing the outgoing call to take place over the outgoing connection.

19. A system for providing call compliance, said system comprising:

a connection unit having an incoming connection and an outgoing connection, the incoming connection capable of receiving a call into the system, receiving an authentication number from a caller, and receiving an identifier of a destination to which a call is to be initiated, the outgoing connection capable of initiating the call to the destination;

an account database containing account information;

a computer server for verifying the authentication number against the account database to evaluate corresponding account information, for determining whether the caller on the incoming connection can initiate an outgoing call, updating account information based on the outgoing call and for providing call compliance treatment to the outgoing call to the destination.

20. The system of claim 19 wherein the authentication number is a pre-registered ANI.

21. The system of claim 19 wherein the authentication number is an account number and a corresponding PIN.

22. The system of claim 19 wherein the computer server provides call compliance treatment by:

checking a do-not-call database for an indication of whether the destination is a do-not-call destination;

if it is determined that the destination is a do-not-call destination, blocking the outgoing call from taking place over the outgoing connection; and if it is determined that the destination is not a do-not-call destination, allowing the outgoing call to take place over the outgoing connection.

23. The system of claim 22, wherein the call compliance treatment occurs at a central switching facility or a distributed access facility.

24. The system of claim 19, wherein receiving said call involves receiving a telephone call from the caller.

25. The system of claim 22, wherein the identifier is a telephone number of the destination.

26. The system of claim 25, wherein checking the do-not-call database for an indication of whether the destination is a do-not-call destination includes determining whether the called telephone number is present in the do-not-call database and if present, treating the destination as a do-not-call destination.

27. The system of claim 22, wherein the call compliance treatment further comprises:

if it is determined that the destination is not a do-not-call destination and after allowing the call to take place, monitoring the call for an occurrence of an update signal.

28. The system of claim 27, wherein the call compliance treatment further comprises:

if it is determined that the destination is not a do-not-call destination and after allowing the call to take place, monitoring the call for an occurrence of an update signal from the caller, said update signal being an indication to identify said destination as a do-not-call destination in said database.

29. The system of claim 28, wherein the call compliance treatment further comprises:

if it is determined that the destination is not a do-not-call destination and after allowing the call to take place, detecting an update signal from the caller and in response to detecting said update signal identifying said destination as a do-not-call destination in said database.

30. The system of claim 22, wherein the incoming connection is a 1-800 line, a local access number or any other means of access.

31. The system of claim 19, wherein the computer server is further capable of charging fees to an account based on the length of the incoming or outgoing call or both.

32. The system of claim 19, wherein the connection unit is further capable of receiving an indication to exempt an outgoing call from call compliance treatment.

33. The system of claim 32, wherein the computer server is further capable of charging fees to the account based on a combination of any of a periodic maintenance fee, the call treatment, length of the incoming call and length of the outgoing call.

34. The system of claim 19 further comprising any of a web based interface, live operator, and mail to activate an account and its corresponding account number.

35. A system for providing call compliance, said system comprising:

a connection unit having an incoming connection and an outgoing connection, the incoming connection capable of receiving a call into the system, receiving an authentication number from a caller, and receiving an identifier of a destination to which a call is to be initiated, the outgoing connection capable of initiating the call to the destination;

an account database containing account information;

a computer server for verifying the authentication number against the account database to evaluate corresponding account information, for determining whether the caller on the incoming connection can to initiate an outgoing call, updating account information based on the outgoing call; and for providing call compliance treatment to the outgoing call to the destination by:

(i) checking a do-not-call database for an indication of whether the destination is a do-not-call destination;

(ii) if it is determined that the destination is a do-not-call destination, blocking the outgoing call from taking place over the outgoing connection; and (iii) if it is determined that the destination is not a do-not-call destination, allowing the outgoing call to take place over the outgoing connection.

36. A computer program product comprising a non-transitory computer readable medium having computer readable program codes for execution by a processor to perform functions, the functions comprising:

receiving a call from a caller on an incoming connection;

receiving an authentication number from the caller on the incoming connection;

verifying the authentication number against an account database to evaluate corresponding account information;

enabling the caller on the incoming connection to initiate an outgoing call on an outgoing connection based on account information;

receiving over the incoming connection an identifier of a destination to which a call is to be initiated over the outgoing connection;

providing call compliance treatment to the outgoing call to the destination; and updating account information based on the outgoing call.

* * * * *